United States Patent
Linden

(10) Patent No.: US 7,751,773 B2
(45) Date of Patent: Jul. 6, 2010

(54) PORTABLE COMMUNICATION DEVICE HAVING A MEDIA TIME CONTROLLER

(75) Inventor: Thomas S. Linden, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 637 days.

(21) Appl. No.: 11/668,730

(22) Filed: Jan. 30, 2007

(65) Prior Publication Data

US 2008/0181536 A1 Jul. 31, 2008

(51) Int. Cl.
*H04H 20/71* (2008.01)
*H04K 3/00* (2006.01)
(52) U.S. Cl. .................. 455/3.03; 725/62; 725/105
(58) Field of Classification Search ................ 455/3.01, 455/3.03, 3.05, 566; 725/29, 62, 105
See application file for complete search history.

(56) References Cited

U.S. PATENT DOCUMENTS

| 2005/0107073 A1 | 5/2005 | Cheiky et al. |
| 2005/0261031 A1* | 11/2005 | Seo et al. .................. 455/566 |
| 2006/0041927 A1 | 2/2006 | Stark et al. |
| 2007/0078731 A1* | 4/2007 | Hameen-Anttila et al. .... 705/27 |

FOREIGN PATENT DOCUMENTS

KR 10-0662376 12/2006

OTHER PUBLICATIONS

International Search Report and Written Opinion for International Application No. PCT/IB2007/002161 dated Dec. 27, 2007.
International Preliminary Report on Patentability for International Application No. PCT/IB2007/002161 dated Apr. 24, 2009.

* cited by examiner

*Primary Examiner*—Lee Nguyen
(74) *Attorney, Agent, or Firm*—Renner, Otto, Boisselle & Sklar, LLP

(57) ABSTRACT

A portable communication device includes a media time controller that facilitates searching for and viewing media content based on user-selected time constraints. The media time controller causes the portable communication device to prompt a user for a time constraint value and to receive user input indicative of the time constraint value. The portable communication device queries a media content database for media content files with durations that are consistent with the time constraint value. The portable communication device with a media time controller allows the user to quickly find suitable media for the time available at the moment.

24 Claims, 6 Drawing Sheets

PORTABLE COMMUNICATION DEVICE HAVING A MEDIA TIME CONTROLLER

TECHNICAL FIELD OF THE INVENTION

The present invention relates generally to portable communication devices, and, more particularly, to a portable communication device and method for browsing media content based on user-selectable time constraints.

DESCRIPTION OF RELATED ART

In recent years, portable communication devices, such as mobile phones, personal digital assistants, mobile terminals, etc., continue to grow in popularity. As the popularity of portable communication devices continues to grow, today's wireless landscape is rapidly changing as mobile phones and networks are being enhanced to provide features and services beyond voice communications. The wireless industry is experiencing a rapid expansion of mobile data services. In addition, the features associated with certain types of portable communication devices have become increasingly diverse. To name a few examples, many portable communication devices have cameras, text messaging capability, Internet browsing functionality, electronic mail capability, video playback capability, audio playback capability, image display capability, position sensing capability and hands-free headset interfaces.

As portable communication device continue to evolve in terms of functionality, users increasingly rely on the convenience associated with their portable communication devices for activities such as taking photos, scheduling meetings, Internet browsing, accessing email accounts and the like. As portable communication devices become more robust in terms of processing speed and memory, device users also rely on portable communication devices for browsing, downloading, viewing and/or listening to media content via their portable communication devices.

SUMMARY

In view of the foregoing, a need exists for additional mobile data services, and application programs for providing additional mobile data services, such as a media content browsing application program that facilitates searching for and viewing media content that is compatible with user-selected time constraints.

One aspect of the technology relates to portable communication device including a memory and a controller coupled to the memory. The controller executes a media time controller program stored on a machine-readable medium, wherein when the media time controller program is loaded in memory in the portable communication device and executed causes the portable communication device to receive user input indicative of a time constraint value, query a media content database for media content based on the received time constraint value and display available media content based on the received time constraint value.

According to another aspect, the media time controller program causes the portable communication device to prompt a user for time constraint information.

According to another aspect, the media time controller program causes the portable communication device to prompt a user with a user-manipulatable graphical interface.

According to another aspect, the media time controller program causes the portable communication device to dynamically update the querying of the media content database for media content in response to receiving an updated time constraint value, and dynamically update the displaying of available media content based on the updated time constraint value.

According to another aspect, the media time controller program causes the portable communication device to search for media files having a run time and/or remaining unviewed run time that is less than the received time constraint value.

According to another aspect, the media time controller program causes the portable communication device to search for media files having a combined download time and run time that is less than the received time constraint value.

According to another aspect, the media time controller program causes the portable communication device to search for media files having a run time and/or unviewed run time that is less than the received time constraint value plus or minus a predetermined time value variable.

According to another aspect, the media time controller program causes the portable communication device to query a locally stored media content database and/or a remote media content database for media content based on the received time constraint value.

According to another aspect, the portable communication device is a mobile telephone.

Another aspect of the technology relates to a method of providing media content to a user of a portable communication device that includes receiving user input indicative of a time constraint value, querying a media content database for media content based on the received time constraint value, and displaying available media content based on the received time constraint value.

According to another aspect, the method includes prompting a user for time constraint information.

According to another aspect, prompting a user includes presenting a user-manipulatable graphical interface.

According to another aspect, the graphical interface is a representation of a clock face.

According to another aspect, the media content database includes media content stored on the portable communication device.

According to another aspect, the media content stored on the portable communication device includes media content that has not been viewed and media content that has been partially viewed.

According to another aspect, the media content database is a remote media content database.

According to another aspect, the method includes receiving an updated time constraint value, dynamically updating the querying of the media content database for media content based on the updated time constraint value, and dynamically updating the displaying of available media content based on the updated time constraint value.

According to another aspect, the method includes sorting displayed media based on amount of time to experience media content.

According to another aspect, the method includes sorting displayed media content based on download time and time required to experience media.

According to another aspect, querying a media content database includes searching for media files having a run time that is less than the received time constraint value.

According to another aspect, querying a media content database includes searching for media files having a run time and/or remaining unviewed run time that is less than the received time constraint value.

According to another aspect, querying a media content database includes searching for media files having a combined download time and run time that are less than the received time constraint value.

According to another aspect, querying a media content database includes searching for media files having a run time and/or unviewed run time that is less than the received time constraint value plus or minus a predetermined time value variable.

Another aspect of the technology relates to a program stored on a machine-readable medium, the program being suitable for use on a portable communication device, wherein when the program is loaded in memory in the portable communication device and executed causes the portable communication device to receive user input indicative of a time constraint value, query a media content database for media content based on the received time constraint value, and display available media content based on the received time constraint value.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
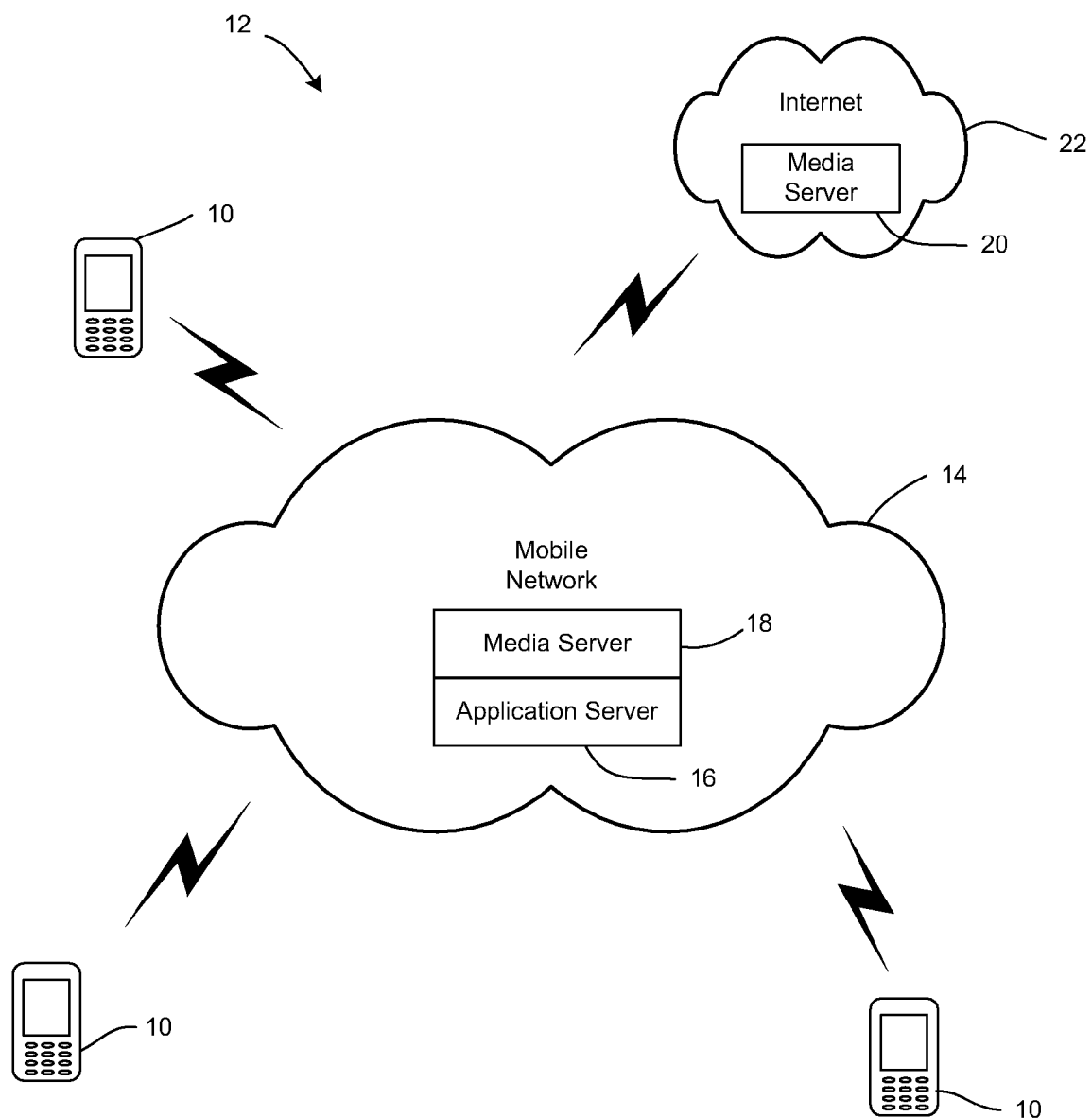
FIG. 1 is a diagrammatic illustration of a communications system including a portable communication device on which aspects of the technology may be carried out.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

The present disclosure describes a media content browser and method of providing media content to a user based on a user-selected time constraint value. By receiving user input indicative of a user-selected time constraint, a portable communication device is equipped to search local and/or remote media content databases for media content that is compatible with or otherwise conforms to the user-defined time constraint. This functionality allows the portable communication device to enhance a user's overall media browsing and viewing experience.

As used herein, the term "portable communication device" includes portable radio communication equipment. The term "portable radio communication equipment," which may be referred to below as a mobile phone, a mobile device, a mobile radio terminal or a mobile terminal, includes all electronic equipment, including, but not limited to, mobile telephones, pagers, communicators, i.e., electronic organizers, smartphones, personal digital assistants (PDAs), or the like. While the present invention is being discussed with respect to portable communication devices, it is to be appreciated that the invention is not intended to be limited to portable communication devices, and can be applied to any type of electronic equipment capable of being used for voice and/or data communication in conjunction with media browsing capability.

Referring initially to FIG. 1, a portable communication device 10 may be configured to operate as part of a communication system 12. The communication system 12 includes a mobile network 14, such as a mobile cellular telephony network, that facilitates communication, such as voice communication and/or data transfer between a plurality of portable communication devices 10, such as mobile phones, mobile terminals or the like. The mobile network 14 includes one or more servers (referred to generally as application server 16) for managing calls placed by and destined to the portable communication device 10, as well as supporting one or more applications (e.g., a media content browsing application) by (e.g., including appropriate hardware and/or application programs for browsing, downloading, streaming and/or viewing media content). In the illustrated embodiment, the mobile network 14 also includes a media server 18 (also referred to as a media content database) on which a variety of media content (e.g., video content, audio content, podcasts, television programs and the like) may be stored. For purposes of the present discussion, the portable communication device 10 will be described with respect to media browsing, searching and/or viewing functionality based on user-selected time constraints. In accordance with at least one embodiment, the portable communication device 10 may engage in media browsing and/or searching functionality with respect to media content stored on a remote system (e.g., a media server or media content database 20 accessible via the Internet 22.)

It will be appreciated that the mobile network 14 includes a network infrastructure, portions of which are used or otherwise accessed by the portable communication devices. The portable communication devices 10 may interact with each other and/or the network infrastructure in accordance with any suitable communication standard, including, but not limited to, Advanced Mobile Phone Service (AMPS), Digital Advanced Mobile Phone Service (D-AMPS), General Packet Radio Service (GPRS), Universal Mobile Telecommunications System (UMTS), Global System for Mobile Communications (GSM), Code Division Multiple Access (CDMA), Voice-Over IP (VoIP), Session Initiated Protocol (SIP), Wireless Local Area Network (WLAN) or the like. In other words, the communication system shown in FIG. 1 is provided for purposes of explaining aspects of the present invention, without limiting the invention to a particular communication system design, architecture or communication standard.

Figure 2:
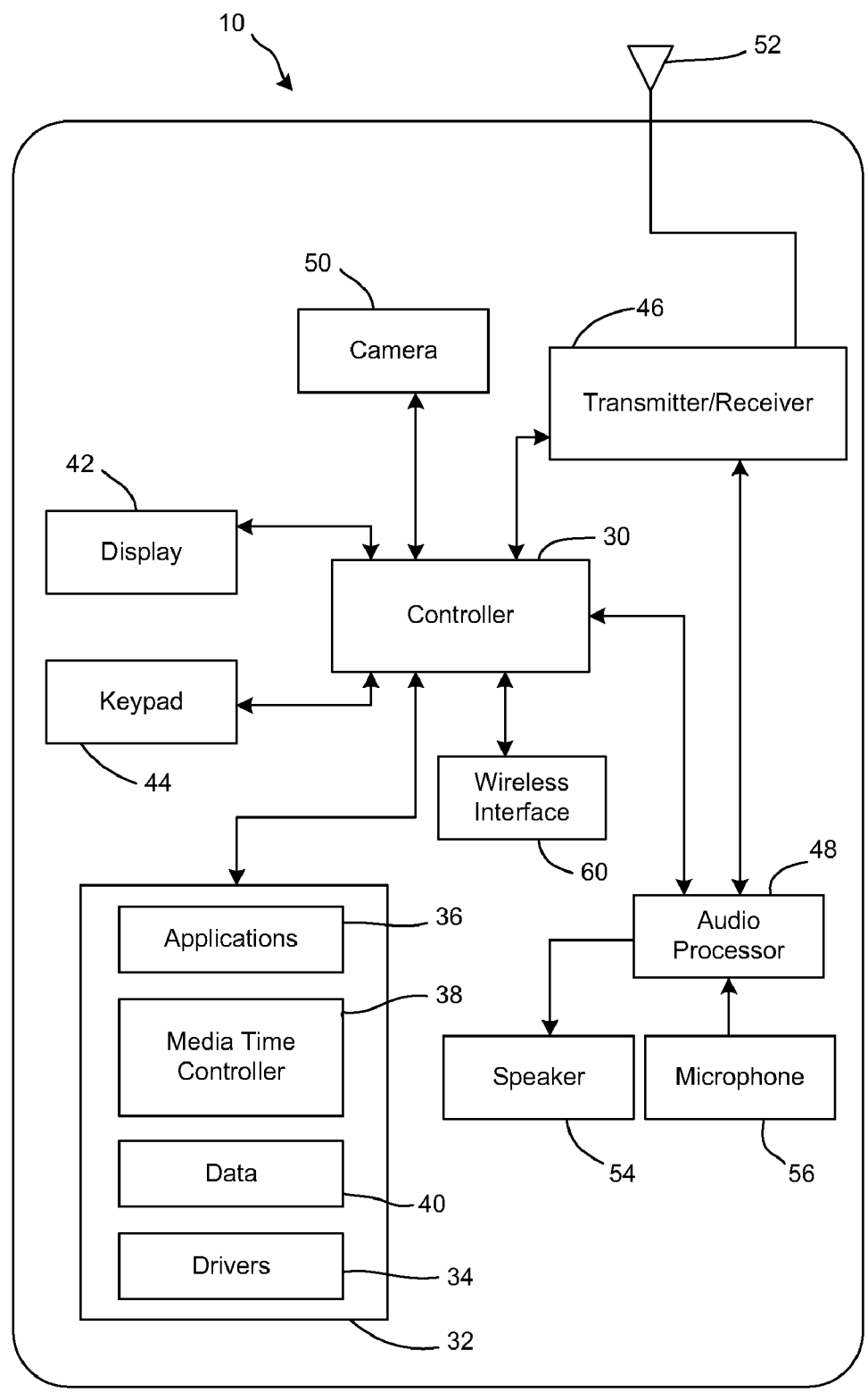
FIG. 2 is a diagrammatic illustration of a portable communication device in accordance with aspects of the technology.

FIG. 2 represents a functional block diagram of a portable communication device 10. The portable communication device 10 includes a controller 30 that controls the overall operation of the portable communication device. The controller 30 may include any commercially available or custom microprocessor or microcontroller. Memory 32 is operatively connected to the controller 30 for storing control programs and data used by the portable communication device. The memory 32 is representative of the overall hierarchy of memory devices containing software and data used to implement the functionality of the portable communication device in accordance with one or more aspects described herein. The memory 32 may include, for example, RAM or other volatile solid-state memory, flash or other non-volatile solid-state memory, a magnetic storage medium such as a hard disk drive, a removable storage media, or other suitable storage means. In addition to handling voice communications, the portable communication device 10 may be configured to transmit, receive and process data, such as text messages (also known as short message service or SMS), electronic mail messages, multimedia messages (also known as MMS), image files, video files, audio files, ring tones, streaming audio, streaming video, data feeds (e.g., podcasts) and so forth.

In the illustrated embodiment, memory 32 stores drivers 34 (e.g., I/O device drivers), application programs 36, including a media time controller application program 38 (also referred to as a media content browser or simply as a media time controller), and application program data 40. The I/O device drivers include software routines that are accessed through the controller 30 (or by an operating system (not shown) stored in memory 32) by the application programs, including the media time controller application program 38, to communicate with devices such as a display 42 and keypad 44 (e.g., a standard keypad, a QWERT keypad or a touch screen keypad) as well as other input/output ports.

The application programs, including the media time controller application program 38, comprise programs that implement various features of the portable communication device 10, such as voice calls, e-mail, Internet access, media content browser, contact manager and the like. As is described more fully below, the media time controller application program 38 comprises a program, logic routine or code that enables the user to browse and/or search for media content stored on local and/or remote media content databases based on user-selected time constraint information.

A person having ordinary skill in the art of computer programming, and specifically in applications programming for mobile phones, will consider it obvious in view of the provided description how to program a mobile phone to operate and carry out the functions described herein with respect to the media time controller 38 (and any interfacing between the media time controller 38 and other application programs (e.g., messaging application programs, media application programs and the like). Accordingly, details as to the specific programming code have been left out. Also, while the time-constraint-based media content search functionality is carried out via the controller 30 and media time controller 38 (alone or in conjunction with other application programs) in memory 32 in accordance with inventive aspects, such function also could be carried out via dedicated hardware, firmware, software or combinations thereof without departing from the scope of the present invention.

With continued reference to FIG. 2, the controller 30 interfaces with the aforementioned display 42 and keypad 44 (and any other user interface device(s)), a transmitter/receiver 46 (often referred to as a transceiver), audio processing circuitry, such as an audio processor 48, and a position determination element (not shown), such as a global positioning system (GPS) receiver. The portable communication device 10 may include a camera 50 that captures digital pictures and/or video. Image and/or video files corresponding to the pictures and/or video may be stored in memory 32 (e.g., in the case of video files, in a local media content database, which may be searched in accordance with the medial time controller functionality).

An antenna 52 is coupled to the transmitter/receiver 46 such that the transmitter/receiver 46 transmits and receives signals via antenna 46, as is conventional. The portable communication device includes an audio processor 48 for processing the audio signals transmitted by and received from the transmitter/receiver. Coupled to the audio processor 48 are a speaker 54 and microphone 56, which enable a user to listen and speak via the portable communication device. Audio data may be passed to the audio processor 48 for playback to the user. The audio data may include, for example, audio data from an audio file stored in the memory 32 and retrieved by the controller 30. The audio processor 48 may include any appropriate buffers, decoders, amplifiers and the like.

The portable communication device also may include one or more local wireless interfaces (indicated generally as wireless interface 60), such as an infrared transceiver and/or an RF adapter, e.g., a Bluetooth adapter, WLAN adapter, Ultra-Wideband (UWB) adapter and the like, for establishing communication with an accessory, a hands free adapter, e.g., a headset that may audibly output sound corresponding to audio data transferred from the portable communication device 10 to the adapter, another mobile radio terminal, a computer, or any other electronic device. Also, wireless interface 60 may be representative of an interface suitable for communication within a cellular network or other wireless wide-area network (WWAN).

Figure 3:
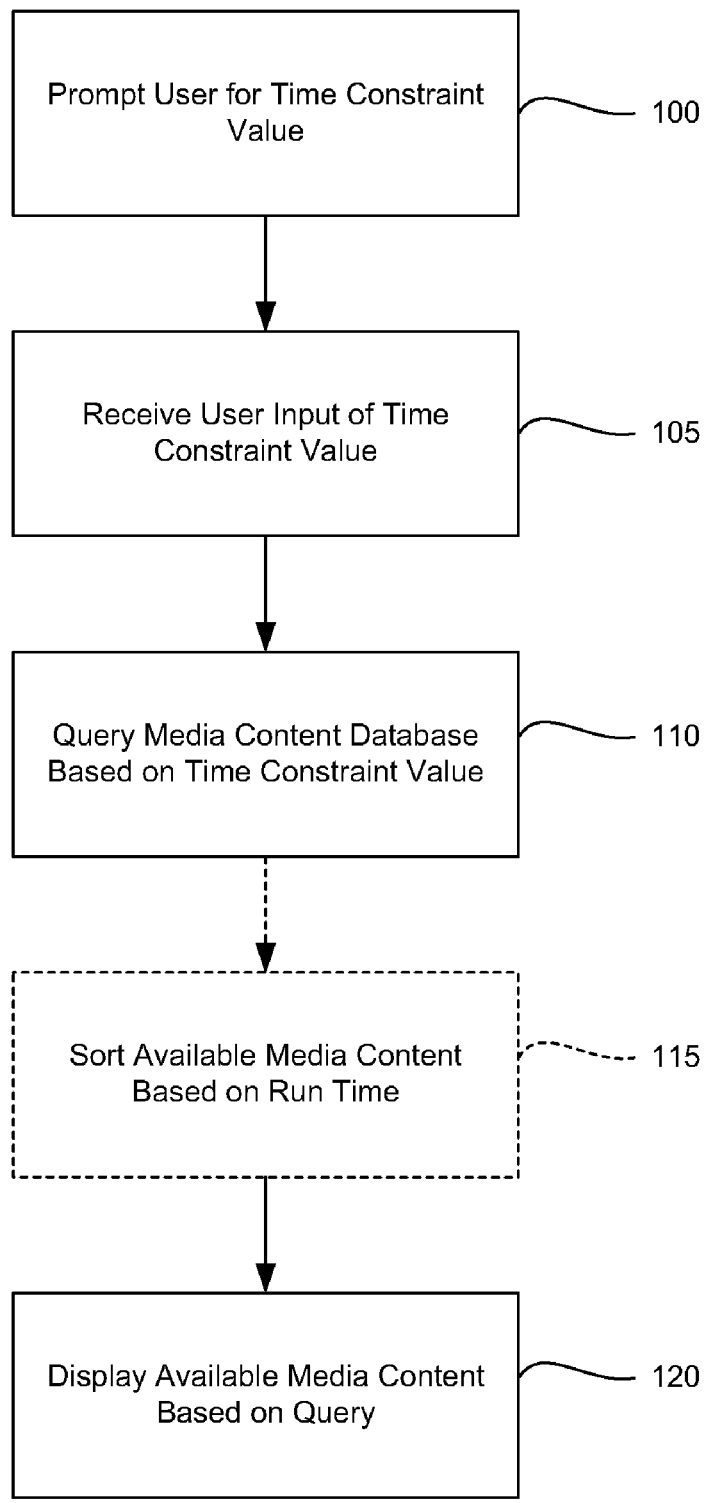
FIG. 3 is a flow chart or functional diagram representing a method of providing media content to a user of a portable communication device in accordance with one embodiment.
Figure 4:
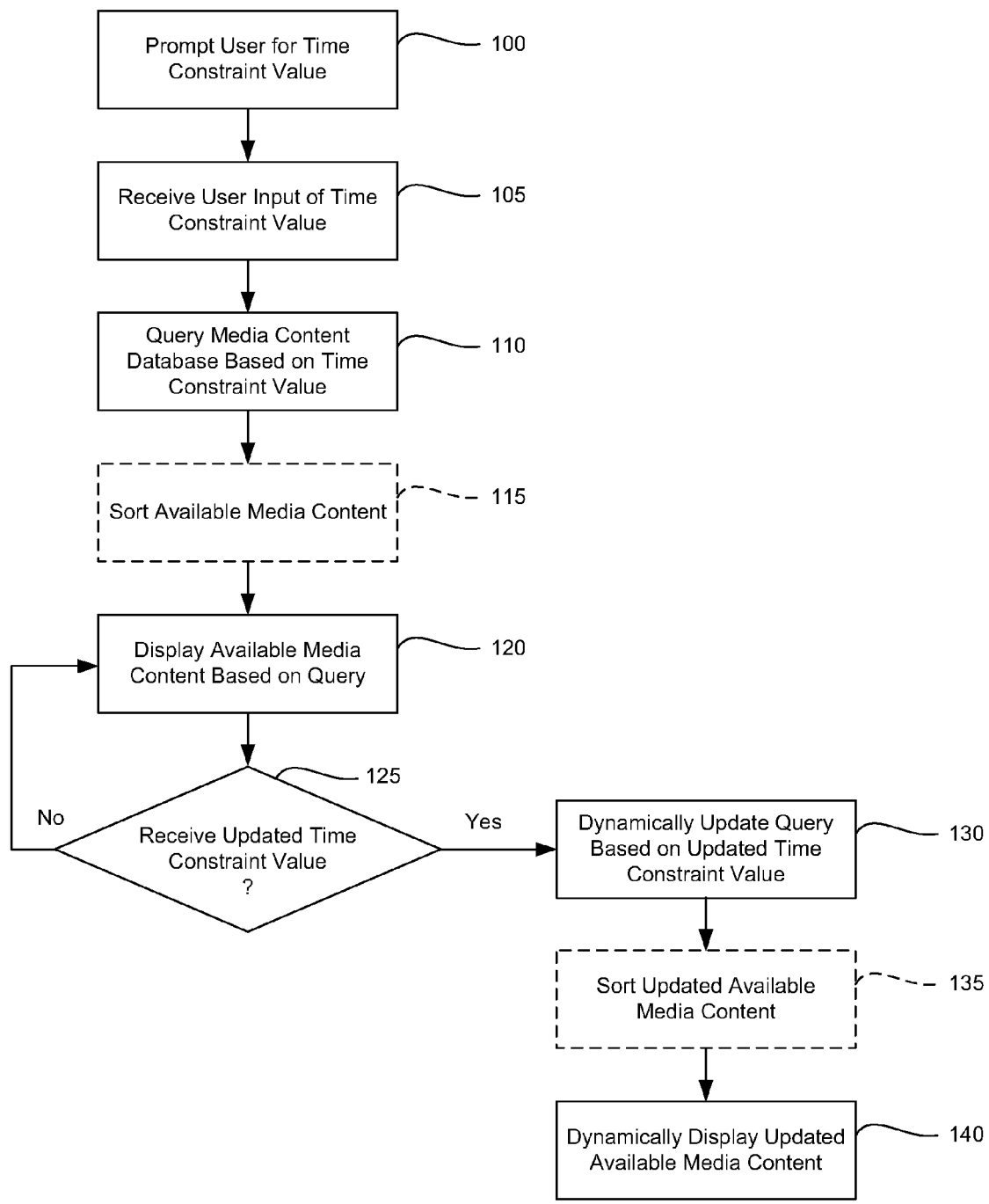
FIG. 4 is a flow chart or functional diagram representing a method of providing media content to a user of a portable communication device in accordance with another embodiment.

While for purposes of simplicity of explanation, the flow charts or functional diagrams in FIGS. 3-4 include a series of steps or functional blocks that represent one or more aspects of the relevant operation of the portable communication device 10. It is to be understood and appreciated that aspects of the invention described herein are not limited to the order of steps or functional blocks, as some steps or functional blocks may, in accordance with aspects of the present invention occur in different orders and/or concurrently with other steps or functional blocks from that shown or described herein. Moreover, not all illustrated steps or functional blocks of aspects of relevant operation may be required to implement a methodology in accordance with an aspect of the invention.

Furthermore, additional steps or functional blocks representative of aspects of relevant operation may be added without departing from the scope of the present invention.

The methodologies illustrated in FIG. 3-4, which are implemented on or through a portable communication device, relate to a method of browsing, searching for or otherwise providing media content to a user of a portable communication device based on user-selected time constraint information. Turning now to FIG. 3, a method of providing media content to a user of a portable communication device begins at functional block 100 where the portable communication device prompts the user for time constraint information (e.g., a time constraint value). In one embodiment, the time constraint value for which the portable communication device prompts the user is equivalent to or otherwise representative of an amount of time that the user has available for enjoying a media experience (e.g., viewing a video clip, a movie, a television program, a podcast or the like).

Figure 5:
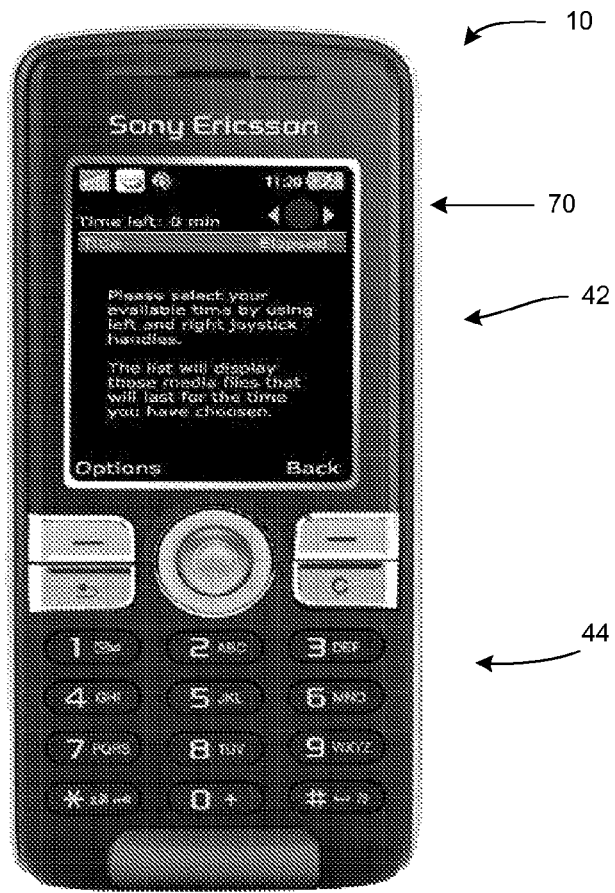
FIG. 5 is a diagrammatic illustration of a mobile telephone as an exemplary portable communication device showing an exemplary screen shot.

The portable communication device is equipped with a suitable graphical user interface for prompting the user for a time constraint value. FIG. 5 illustrates a portable communication device having a display 42 on which an exemplary graphical user interface 70 is shown. When the user of the portable communication device enters the media content browser, the user may be presented with an option of selecting or otherwise indicating an amount of time available for enjoying any type of media (e.g., a time constraint value). In the illustrated exemplary embodiment of FIG. 5, the user is presented with instructions for manipulating a graphical user interface 70, which includes a clock-like icon with time selection arrows disposed adjacent respective sides (e.g., a media time clock). The right arrow associated with the media time clock may be engaged or otherwise manipulated by the user for adding time or otherwise increasing the time constraint value, while the left arrow associated with the media time clock may be engaged or otherwise manipulated by the user to decrease or otherwise lower the time constraint value.

Figure 6:
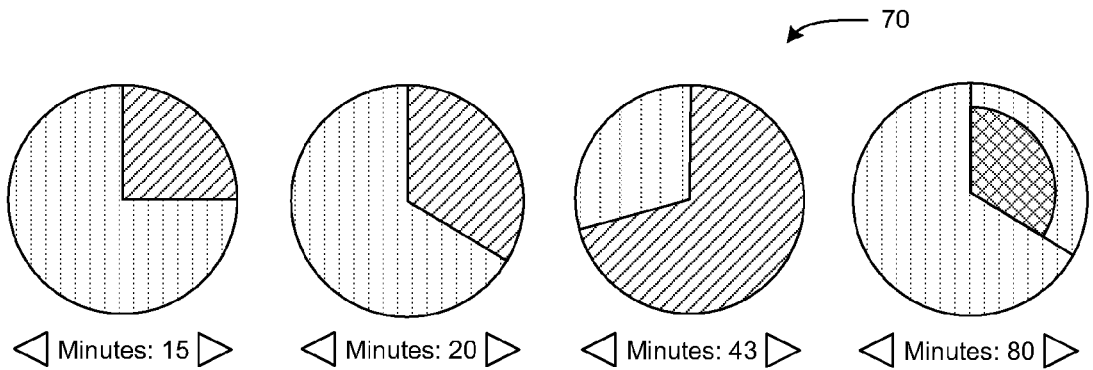
FIG. 6 includes diagrammatic illustrations of an exemplary user-manipulatable graphical user interface in accordance with one embodiment.

FIG. 6 illustrates views of an exemplary graphical user interface 70 (e.g., media time clock) for a variety of time constraint values. As will be discussed more fully below, the media time controller provides for a dynamic adjusting of the time constraint value, which, in turn, may result in dynamic adjusting of the search results and display of the search results. While the graphical user interface has been illustrated and described with respect to a media time clock, it is to be appreciated that any other suitable graphical user interface may be employed without departing from the scope of the present invention. For example, the graphical user interface used for a selection of a time constraint value may include a time bar, a scroll bar, a digital time entry field for entry of a time constraint value via the keypad, or the like.

Returning to FIG. 3, at functional block 105, the portable communication device receives user input indicative of a time constraint value. As represented by the exemplary media time clock shown in FIG. 6, the time constraint value may be any amount of time up to a predefined limit, (e.g., two hours or more or less). At functional block 110, the portable communication device queries or otherwise transmits a search criteria to a media content database based on the received time constraint value. The query or search for suitable media content may include searching for media content having metadata representative of run time or duration, remaining unviewed run time or duration and/or download time that is consistent with the user-selected time constraint value.

The media content database being queried by the portable communication device may be a local media content database (e.g., media content stored locally on a memory within the portable communication device) or a remote media content database (e.g., a remote media server as a part of the mobile network or a media server accessible via the Internet). It will be appreciated that the query or search step represented by functional block 110 includes the media time controller program causing the portable communication device to search for media files (e.g., video clips, movies or movie clips, television programs, podcasts, audio files or the like) having a duration that falls within the received time constraint value (e.g., plus or minus a predetermined time value variable, such as plus or minus five minutes).

In one embodiment, the media time controller program causes the portable communication device to search for media files having a run time and/or remaining unviewed run time that is less that the received time constraint value. Alternatively or additionally, the portable communication device may search for media files having a combined download time and run time that are less than the received time constraint value. For example, if the received time constraint value is fifteen minutes, the media time controller may cause the portable communication device to search for and locate a media file having a run time or duration of thirteen minutes with a download time of two minutes, while ignoring or otherwise not returning as a search hit a media file having a run time or duration of twelve minutes and a download time of six minutes.

Optionally, at functional block 115, the media time controller may cause the portable communication device to sort the available media content found as a result of the media content query (functional block 110) based on run time or duration (alone or in combination with run time/duration in combination with download time). Alternatively, the available media content found as a result of the media content query (functional block 110) may be sorted based on any other criteria such as artists, type of media file and the like.

Figure 8:
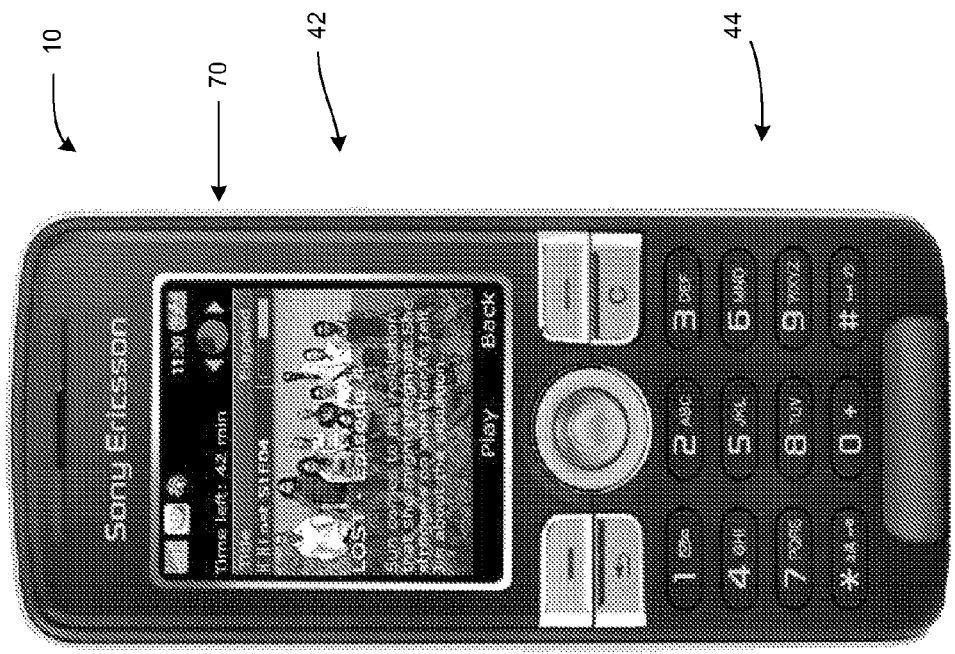
FIG. 8 is a diagrammatic illustration of a mobile telephone as an exemplary portable communication device showing an exemplary screen shot.
Figure 7:
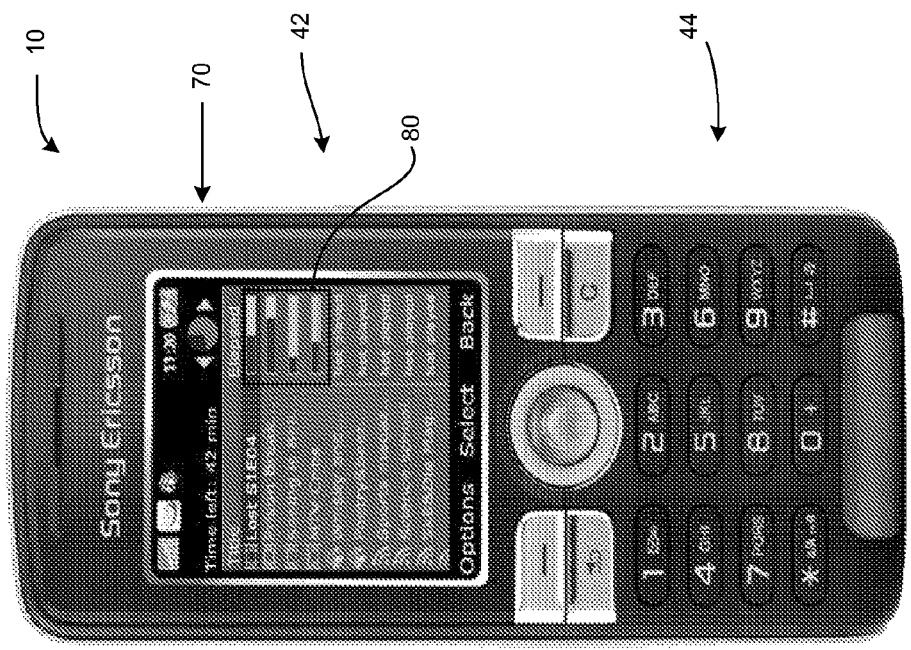
FIG. 7 is a diagrammatic illustration of a mobile telephone as an exemplary portable communication device showing an exemplary screen shot.

At functional block 120, the portable communication device displays the available media content found on the search performed at functional block 110 (optionally in an order determined by the sorting at functional block 115). FIG. 7 illustrates a portable communication device on which media file search results are displayed for a user-selected time constraint value of forty-two minutes. As is shown in the exemplary screen shot of FIG. 7, the returned search results displayed on the portable communication device include media files that have not been viewed, played or otherwise experienced by the user on the portable communication device, as well as media files that have been partially viewed or displayed on the portable communication device. In the illustrated exemplary embodiment, the partially viewed or "paused" media files include a time elapsed bar 80 that shows or otherwise indicates the total time of a given program, as well as the time remaining for the unviewed portion of the program. This elapsed time bar 80 provides a way for the user to allocate and watch previously paused movies or other media files, which may be longer than the user's currently available time for viewing. Of course, the user is free to select any media file displayed within the returned search results, as is shown in the exemplary screen shot of FIG. 8.

Turning now to FIG. 4, an alternative embodiment of a method of browsing media content or otherwise providing media content to a user of a portable communication device is provided. It will be appreciated that functional blocks that are common to both FIG. 3 and FIG. 4 are indicated by the same reference numerals, while new or additional functional blocks are indicated by new reference numerals. The method illustrated in FIG. 4 includes the previously-described steps or functional blocks of prompting a user for a time constraint value (functional block 100), receiving user input indicative of a user-selected time constraint value (functional block 105), querying a media content database for media files based on the received time constraint value (functional block 110), optionally sorting the available media content based on any suitable criteria (functional block 115), and displaying the available media content based on the previously-performed query or search (functional block 120).

In a preferred embodiment, the media time controller program is dynamic in nature such that the user has the option of adjusting or otherwise selecting a different time constraint value at any time during the use of the media time controller program. For example, at functional block 125, the portable communication device determines whether or not an updated time constraint value has been received (e.g., received by the user manipulating or otherwise adjusting the media time clock 70 to indicate a different or updated time constraint value). In this example, the user may be in the midst of a media content browsing session in which the user believes that he/she has fifteen minutes for media browsing and viewing, for example, while waiting for a friend at a coffee shop. It may happen that the user's friend calls to let the user know that the friend is running late, and will not arrive at the coffee shop for approximately twenty-five minutes. In this instance, the user has the option of selecting or indicating an updated time constraint value (e.g., twenty-five minutes) by manipulating or otherwise adjusting the media time clock 70.

In response to receiving an updated time constraint value, the media time controller program causes the portable communication device to dynamically update the media content file query or search based on the updated time constraint value. In the instant example, the portable communication device would perform an additional search for media files having a run time/duration and download time in line or consistent with the updated time constraint value. At functional block 135, the portable communication device may sort the updated available media content in one of the ways described more fully above with reference to FIG. 3. (e.g., by run time, by artist, by type of media file or the like).

At functional block 140, the portable communication device dynamically displays the updated available media content, that is, the media content that is available based on the newly updated time constraint value. Stated more simply, the media time controller program is equipped with a graphical user interface (e.g., a media time clock) that is dynamic with the presented with the presented media content, meaning that the list of available media files changes in line with the user's interaction with the graphical user interface.

It will be appreciated that a portable communication device equipped with a media time controller program provides the user with the capability of conveniently and efficiently browsing and viewing media content based on the user's time available for media browsing at that moment. As one example, a user may be seated on a train going to or from work with a ride time of approximately forty minutes. The user may like to spend his/her time while watching a television show. Instead of browsing a conventional television schedule by channel or a specific content category, the user may use the more efficient media time controller to search for programs that will last for as long as the user has available time. By setting the media time clock to around forty minutes, the media time controller program causes the portable communication device to search for and show television programs that are available for viewing within the user's predetermined time constraints. The user is free to choose a television program that will fit his/her time schedule. The user may sit back and enjoy the show comfortably knowing that he/she will see the entire show, and not miss the end of the show. Artisans will appreciate that the media time controller functionality described above provides the user with a variety of options for optimizing or otherwise making fuller use of time available for media browsing.

As will be appreciated by one of skill in the art, computer program elements and/or circuitry elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A portable communication device comprising:
a memory; and a controller coupled to the memory, wherein the controller executes a media time controller program stored on a machine-readable medium, wherein when the media time controller program is loaded in memory in the portable communication device and executed causes the portable communication device to:

receive user input indicative of a time constraint value, wherein the time constraint value is representative of an amount of time the user currently has for viewing media;

query a media content database for media content based on the received time constraint value; and display available media content based on the received time constraint value.

2. The portable communication device according to claim 1, wherein the media time controller program causes the portable communication device to prompt a user for time constraint information.

3. The portable communication device according to claim 2, wherein the media time controller program causes the portable communication device to prompt a user with a user-manipulatable graphical interface.

4. The portable communication device according to claim 1, wherein the media time controller program causes the portable communication device to:

dynamically update the querying of the media content database for media content in response to receiving an updated time constraint value; and dynamically update the displaying of available media content based on the updated time constraint value.

5. The portable communication device according to claim 1, wherein the media time controller program causes the portable communication device to search for media files having a run time and/or remaining unviewed run time that is less than the received time constraint value.

6. The portable communication device according to claim 1, wherein the media time controller program causes the portable communication device to search for media files having a combined download time and run time that are less than the received time constraint value.

7. The portable communication device according to claim 1, wherein the media time controller program causes the portable communication device to search for media files having a run time and/or unviewed run time that is less than the received time constraint value plus or minus a predetermined time value variable.

8. The portable communication device according to claim 1, wherein the media time controller program causes the portable communication device to query a locally stored media content database and/or a remote media content database for media content based on the received time constraint value.

9. The portable communication device according to claim 1, wherein the portable communication device is a mobile telephone.

10. A method of providing media content to a user of a portable communication device, the method comprising:

receiving user input indicative of a time constraint value, wherein the time constraint value is representative of an amount of time the user currently has for viewing media;

querying a media content database for media content based on the received time constraint value; and displaying available media content based on the received time constraint value.

11. The method according to claim 10, further comprising: prompting a user for time constraint information.

12. The method according to claim 11, wherein prompting a user includes presenting a user-manipulatable graphical interface.

13. The method according to claim 12, wherein the graphical interface is a representation of a clock face.

14. The method according to claim 10, wherein the media content database includes media content stored on the portable communication device.

15. The method according to claim 14, wherein the media content stored on the portable communication device includes media content that has not been viewed and media content that has been partially viewed.

16. The method according to claim 10, wherein the media content database is a remote media content database.

17. The method according to claim 10, further comprising: receiving an updated time constraint value;

dynamically updating the querying of the media content database for media content based on the updated time constraint value; and dynamically updating the displaying of available media content based on the updated time constraint value.

18. The method according to claim 10, further comprising sorting displayed media based on amount of time to experience media content.

19. The method according to claim 10, further comprising sorting displayed media content based on download time and time required to experience media.

20. The method according to claim 10, wherein querying a media content database includes searching for media files having a run time that is less than the received time constraint value.

21. The method according to claim 10, wherein querying a media content database includes searching for media files having a run time and/or remaining unviewed run time that is less than the received time constraint value.

22. The method according to claim 10, wherein querying a media content database includes searching for media files having a combined download time and run time that are less than the received time constraint value.

23. The method according to claim 10, wherein querying a media content database includes searching for media files having a run time and/or unviewed run time that is less than the received time constraint value plus or minus a predetermined time value variable.

24. A program stored on a machine-readable medium, the program being suitable for use on a portable communication device, wherein when the program is loaded in memory in the portable communication device and executed causes the portable communication device to:

receive user input indicative of a time constraint value, wherein the time constraint value is representative of an amount of time the user currently has for viewing media;

query a media content database for media content based on the received time constraint value; and display available media content based on the received time constraint value.

* * * * *